April 29, 1958   H. C. COLLIER   2,832,170
DETACHABLE FISHHOOK AND ATTACHING MEANS THEREFOR
Filed May 25, 1955

Howell C. Collier
INVENTOR.

BY *Clarence A. O'Brien*
*and Harvey B. Jacobson*
Attorneys

United States Patent Office 2,832,170
Patented Apr. 29, 1958

2,832,170

DETACHABLE FISHHOOK AND ATTACHING MEANS THEREFOR

Howell C. Collier, Springfield, Mo.

Application May 25, 1955, Serial No. 511,051

3 Claims. (Cl. 43—42.48)

The present invention relates to an artificial lure, a fishing plug, for example, readily attachable and detachable fishhooks, either single or multiple types, and means whereby said hooks are pivotally and detachably mounted on said plug at intended positions.

An obvious object of the invention is to facilitate the storage and carrying of a plurality of selectively usable distinguishably different plugs in a tackle box, and, because the fishhooks are detachable and separate therefrom, to diminish messy and objectionable tangling of equipment such as is often haphazardly thrown together in the stated box.

Plugs and lures having the general structural characteristics and functions touched upon are not new. It is therefore an object of the invention to structurally, functionally and otherwise improve upon analogous prior art constructions and to do so through the medium of an improved construction and arrangement of satisfactorily cooperating elements and parts.

In carrying out a preferred embodiment of the invention, one or more specially constructed anchors are pivotally and detachably mounted on the plug by way of suitable eye screws. Each anchor is characterized by a shank, one end of which is attached to the eye of the stated screw and the shank being made up of expansible and contractible resilient limbs terminating in hooks. A sleeve is fitted slidingly and detachably over the shank, is of a length less than the length of the shank, and carries one or more barbed or conventional-type fishhooks.

Other objects, features and advantages will become more readily apparent from the following description and the accompanying sheet of drawings.

Figure 1:
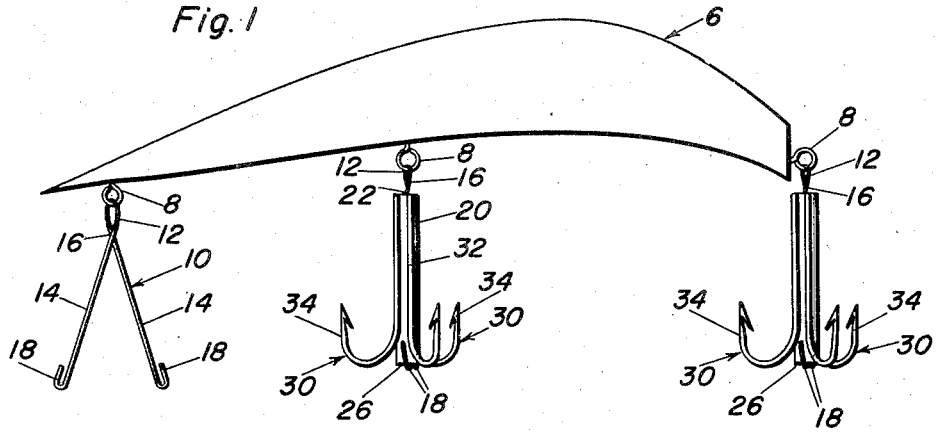
Figure 1 is an elevational view showing a suitably constructed lure, such as a fishing plug, with an improved anchor at the left, and hook-equipped anchors at the right and intermediate portions.

Expressions used in the specification which refer to front or rear, right or left, top and bottom, etc., are in relation to the views appearing in the drawings.

Figure 2:
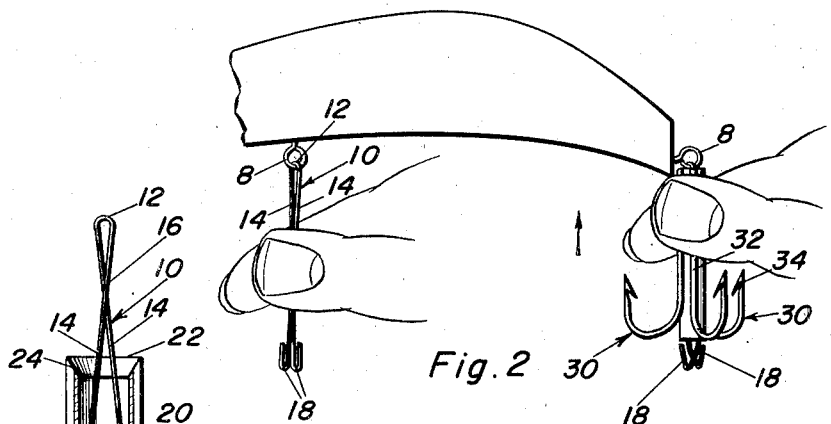
Figure 2 is a side elevational view showing how the springy limbs of the anchor may be pressed together to bring the hooks together to permit the hook-equipped sleeve to be either applied or removed, as the case may be, and also showing how the hook-equipped sleeve is applied, this at the right.
Figure 3:
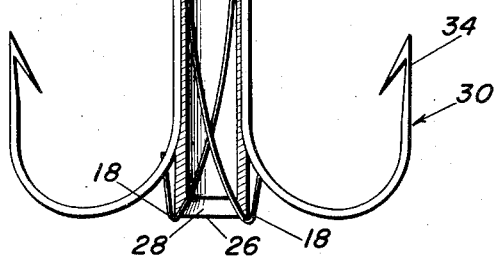
Figure 3 is an enlarged view of the improved anchor and complemental hook-equipped sleeve.

Referring now to the drawings, the plug type lure is of any suitable construction and material and is denoted generally by the numeral 6. Insofar as the essence of the invention is concerned, the plug may be treated as any suitable lure with detachable hook means and a description of a single hook arrangement will suffice, it is believed, to acquaint the reader with the invention involved. Each eye screw carried by the plug is denoted by the numeral 8 and serves as attaching and hinging means for the means 10 which is specifically identified herein as an anchor. This anchor comprises a shank with hook means at the outer end and eye means at the inner end. Actually, the anchor is formed from a length of resilient wire which is bent upon itself intermediate its ends to define the eye 12 which is connected with the eye 8. The shank is made up of crossed limbs, that is, limbs 14 which are crossed over one another at 16. The free ends of the limbs are formed with return bends defining latching hooks 18. As seen in Figure 3, the readily applicable and removable fishhook means comprises an open ended sleeve 20. This sleeve may be of metal, commercial plastics or any other suitable lightweight but durable material. The upper end 22 is beveled, at 24, and the lower end 26 is beveled, at 28. The sleeve is of an over-all length less than the shank so that it may be slid relative to the shank, as shown at the right in Figure 2. By squeezing the limbs and bringing the hooks 18 together, as shown at the left in Figure 2, the "anchor" 10 is readied to permit the sleeve to be applied. The sleeve is then slipped up in place in an obvious manner and is dropped back, so to speak, with the lower edge 26 engaged in the hooks 18. The hooks are allowed to spread apart, and thus the spreadable and contractible shank and hook means serve to keep the sleeve in its intended position. The sleeve is exteriorly provided with one or more fishhooks. In the arrangement seen, there are several fishhooks. Each hook is denoted by the numeral 30 and has an eyeless shank 32 attached suitably to the sleeve and a barbed terminal or bill portion 34. Thus, a sleeve with one or more hooks is readily applicable and removable in relation to the hook-equipped anchor or retainer 10.

It is repeated, therefore, that the invention constitutes a novel contribution to the art and enables an owner to carry plugs and lures on the person without danger. The plugs and lures will not become tangled with one another. Also, without hooks, the plugs are more easily handled and they take up less room in the tackle box. The fisherman may choose a hook size for any lure on any occasion, and can use either one or two hooks, as circumstances require.

It will be evident, too, that with a structure characterized by detachable fishhooks, a still valuable and worthy plug will not have to be discarded, as is sometimes the case, merely because one or more fishhooks have become rusty, broken, lost or dull. It will be clear, also, that a tube-type hook such as is herein utilized can actually be used as the body of the lure itself by merely adding surface hackle, feathers, hair or the like. This, therefore, contributes a further meritorious aspect to the over-all invention. What is more, if and when molded from commercial plastics, varying color schemes may be resorted to and used to comply with the requests of fishermen who attribute color as a factor of attraction in fishing. Finally, the plug on which these hooks are mounted would be more easily seen traveling through the water because of the stream of bubbles generated by and emitted from the tube or tubes. It is a matter of common knowledge that some lures have holes in them for the purpose of making a stream of bubbles. Certain experts claim that fish will follow attraction bubbles to their source.

Since numerous modifications and changes will readily occur to those skilled in the art, it is not desired to limit the invention to the exact construction shown and described, and accordingly, all suitable modifications and equivalents may be resorted to, falling within the scope of the subjoined claims.

What is claimed as new is as follows:

1. In combination, a lure having a fixed eye in one end, a connecting and retaining anchor for a fishhook pivotally mounted at one end on said eye, an elongated imperforate sleeve detachably mounted on said anchor, and at least one fishhook carried by said sleeve, said anchor embodying two connected shank portions of resilient material, said shank portions being of a length greater than the length of said sleeve, said shank portions extending axially through the bore of the sleeve having at least one retainer hook releasably engaging an end portion of said sleeve.

2. In combination, a plug, an anchor embodying a resilient shank having means at one end hingedly attached to said plug and a pair of normally spread apart manually contractible retainer hooks at the other end, an elongated imperforate rigid sleeve encasing and detachably and rotatably mounted on said shank, said retainer hooks releasably engaging one end of the sleeve and maintaining it in place on said shank, and a barbed fishhook having a shank fixed on said sleeve.

3. For use on and in association with a plug, a screw-eye having a screw-threaded shank attachable to said plug, an anchor comprising a length of flexibly resilient wire bent upon itself intermediate its ends and defining an eye which is hingedly and also detachably connected to the eye of said screw-eye and further defining a pair of crossed limbs, the inherent resilient properties of which cause the limbs to spread normally apart and into divergent relationship, the free ends of said limbs having return bends defining retainer hooks, and the combination of an elongated open ended imperforate sleeve of a length less than the length of said limbs, said sleeve encasing and being removably mounted on said limbs and being provided with fishhooks.

References Cited in the file of this patent
UNITED STATES PATENTS

| | | |
|---|---|---|
| 664,476 | Hall | Dec. 25, 1900 |
| 2,033,829 | Helin | Mar. 10, 1936 |
| 2,587,658 | Sleness | Mar. 4, 1952 |
| 2,590,558 | Mickelson | Mar. 25, 1952 |
| 2,594,620 | Braithwaite | Apr. 29, 1952 |

FOREIGN PATENTS

| | | |
|---|---|---|
| 614 | Great Britain | 1909 |
| 3,851 | Great Britain | 1895 |
| 726,188 | France | Feb. 29, 1932 |